United States Patent [19]
Lopez et al.

[11] 3,965,215
[45] June 22, 1976

[54] COHESIVE SEALANT ARTICLES

[75] Inventors: Eugene F. Lopez, Sunnyvale, Calif.;
Anthony Charles Evans, Brussels, Belgium

[73] Assignee: Raychem Corporation, Menlo Park, Calif.

[22] Filed: Oct. 31, 1973

[21] Appl. No.: 411,462

[52] U.S. Cl. .............................. 260/889; 260/2 H; 260/28.5 AS; 260/873; 260/888
[51] Int. Cl.$^2$ .......................................... C08L 23/28
[58] Field of Search ........... 260/888, 889, 878, 896, 260/890, 892, 873, 28.5 AS

[56] References Cited
UNITED STATES PATENTS
3,265,770   8/1966   Edwards ........................... 260/889

*Primary Examiner*—Murray Tillman
*Assistant Examiner*—J. Ziegler
*Attorney, Agent, or Firm*—Lyon & Lyon

[57] ABSTRACT

Coherent articles essentially comprised of a mastic material uniformly dispersed throughout a cross-linked polymeric matrix may be employed in, eg, sheet form as sealants for wire and cable terminations, pipe junctions and the like. Adjacent layers of the articles may be amalgamated by heating, yet they are sufficiently crosslinked as to permit the impartation of heat recoverability.

10 Claims, No Drawings

COHESIVE SEALANT ARTICLES

BACKGROUND OF THE INVENTION

Various approaches have been devised to protect wire and cable splices and terminations and pipe junctions and joints, variously against corrosion, moisture and corona discharge. Ranging from simple tape wrapping to far more sophisticated means, all have in common the objects of economy and adaptability to convenient field installation. In substantial part, resort has been had to the use of "heat recoverable" materials, i.e., polymeric materials which have been dimensionally changed from an original heat stable form to an independently dimensionally heat unstable form capable of moving in the direction of its original form upon the application of heat alone. Examples of such heat recoverable materials are found in Currie U.S. Pat. No. 2,027,962 and in Cook et al U.S. Pat. No. 3,086,242 where heat recoverable sleeves are proposed for protection of substrates. Commonly, such materials are cross-linked during the shape-memory impartation process, and the usual concomitant of that step is to substantially deter sleeve-substrate adhesion. While some workers (ie, G.B. Pat. No. 839,485) have suggested that a remainder of uncross-linked polymeric material may be expressed from the sleeve during recovery in aid of adhesion such material tends to shrink on crystallization, with consequent diminution in adhesion. More often, a sealant or adhesive has been separately supplied between sleeve and substrate. Orr, in U.S. Pat. No. 3,226,807, proposes to protect pipe joints by shrinking a sleeve about a pipe joint first field-coated with an asphaltic or adhesive material. Where sealant material is to be disposed between sleeve and substrate, that is much more conveniently done by employing sleeves whose interiors have been pre-coated with a fusible material (Wetmore U.S. Pat. No. 3,243,211) such as a hot melt adhesive or a viscid fluid (Wetmore U.S. Pat. No. 3,297,819). While useful in many employments, recoverable sleeves lined with hot melt adhesives are somewhat costly, and commonly require more heat than is needed to effect recovery in order to bring the adhesive into play. Sleeves lined with viscid fluids are on the one hand advantaged by the resulting positive seal (e.g., the viscid material moves to seal perforations in the recovered sleeve), while on the other hand the very mobility of the sealant can create problems in some employments. For example, pinholes in pressurized telephone cable about which such sleeves have been recovered could conceivably lead to purging of the sealant with consequent loss of insulative integrity. Moreover, without the aid of mechanical contrivances or other external agencies, such materials cannot practicably be employed in wraparound configurations, where recovery forces could occasion unwinding of the sealant-provided article from about the substrate.

BRIEF SUMMARY OF THE INVENTION

According to this invention there are provided coherent articles, preferably in sheet form, essentially comprised of a mastic material uniformly dispersed throughout the interstices of a cross-linked polymeric matrix present in the article in minor proportion sufficient in extent to maintain it coherent at a crystalline melting or glass transition temperature of the matrix. Preferably at room temperature, but in any case at some temperature between room temperature and the matrix transition temperature, the article exhibits at least second order cohesive blocking. By reason of the crosslinked matrix, even when brought to that transition temperature or above it, articles of the invention remain coherent. Nevertheless, the mastic material sufficiently flows as to wet substrate surfaces for good adhesion. Indeed, when made to contact themselves and brought to the matrix transition temperature, adjacent portions of the articles of this invention amalgamate, viz., their substance sufficiently intermingles or commingles as to prevent visual discernment of any boundary between adjacent plies. Advantage may be taken of the cross-linked matrix in imparting heat recoverability to articles of the invention while at the same time deriving benefit from innate adhesive qualities not ordinarily found in unitary crosslinked polymeric articles. Thus, heat recoverable articles formed according to one aspect of this invention may be recovered about cable, pipe or other substrates to form water resistant sealant jackets, all without resort to separate adhesive application steps or similar expedients characteristic of the prior art. Whether heat recoverable or not, the articles of the invention may in sheet form be employed as wraparound sleeves unburdened by the need for mechanical closures. Because they amalgamate on heating, they may be spiral wrapped about substrates without generating the multiple leak paths which often accompany that mode of application. The manner in which these and other objects and advantages of the invention may be achieved will more clearly appear from the detailed description which follows.

DETAILED DESCRIPTION OF THE INVENTION

"Mastic materials" useful in the practice of this invention are viscid, water resistant macromolecular compositions like non-newtonian fluids in exhibiting both viscous and elastic response to stress, and which exhibit, in the sense of ASTM 1146, at least second oder cohesive blocking (and preferably second order adhesive blocking to metal adherands as well) at a temperature between room temperature and the crystalline melting or glass transition temperature or range of the "matrix" component of the articles of the invention. Most preferably, the mastic materials themselves, as well as the articles of which they form the predominate component, are so blocky at room temperature. Unlike the materials from which the "matrix" component may be formed, the mastic materials are "monotonic", ie, they undergo no substantially abrupt decrease in viscosity upon heating to, e.g., 300°C. Contrarywise, the cross-linkable polymer of which the matrix is composed exhibits a crystalline melting or glass transition temperature point or range between about 140° and 300°F, preferably between about 180° and 250°F. Herein, abbreviated reference to the "transition temperature" of the matrix, or words of like import, are to be construed as referring to that temperature or range of temperature at which the corresponding uncrosslinked polymer undergoes a glass transition or crystalline melting.

The matrix in which the mastic material is dispersed may be made up of essentially any cross-linkable crystalline or glassy polymer, and any of those materials susceptible to the impartation of heat recoverability through a process involving cross-linking may be employed in that role. It is important that the matrix precursor material be crosslinkable and that in the course of attaining that state the gel content of the mastic component is not significantly increased. In appropriate cases resort can be had to chemical crosslinking with, e.g., peroxides, but preferably crosslinking is effected through the agency of high energy ionizing radiation, as conventionally is employed in inducing heat recoverability.

Crosslinking is effected to an extent which, in combination with the relative proportion of mastic to matrix precursor, will ensure retention of coherency at the precursor transition temperature. When crosslinking is gotten through irradiation, dosage should be at least about 10 megarads but less than 20, elsewise scission may become ascendant. Preferably, dosage is from about 12–15 megarads. Pro-rads (e.g., diallyl phthalate, triallyl cyanurate, triallyl isocyanurate, glyceryl trimethacrylate, 1, 6-hexane dioldiacrylate, pentaerythritol tetraacrylate, etc.) may be employed to attain a sufficiency of cross-linking without undue scission. Individual ones of the matrix precursors may be combined with any of the pro-rads with which they are employed in more conventional applications. In any event, cross-linking occurs to an extent sufficient to impart to the unitary, composite article gel content on the order of 5–50 percent by weight. Of course, because the gel content of the mastic is not significantly increased by the crosslinking step, gel content of the composite article will generally be no higher than the combined weight of cross-linkable matrix precursor and, if used, pro-rad.

Among the numerous candidates for matrix employment may be mentioned the following:

| Matrix Material | Transition Temperatures (°F) |
| --- | --- |
| polyethylene | 220 – 275 |
| ethylene-ethyl acrylate copolymers | 185 – 220 |
| polyallomers | ~~300 |
| polycaprolactone | ~~160 |
| polyvinylchlorides | ~~195 |
| butadiene-styrene copolymers | ~~180 |
| aliphatic polyesters | ~~140 |
| polychloroprenes | ~~105 |

Ordinarily, at least about 10 percent by weight of the articles of the invention will be made up of matrix material, and preferably the articles contain from about 15 to about 25 percent by weight matrix. Pro-rad content is generally small, e.g., not more than about 3 percent by weight.

Typically, the properties of a mastic material are not predominantly attributable to any single component, but instead arise from the presence of plural ingredients, usually including at least one rubbery material and one or more tackifying agents. Mastic materials also include, in particular cases, particulate fillers such as carbon black, asphaltic or other extenders, plasticizers, etc., as those skilled in the art well know. Preferred rubbery components of the mastic material include polyisobutylenes such as the medium molecular weight ($\approx$80,000–100,000) material sold by Exxon Corporation under the name Vistanex L-80, ethylene-propylene terpolymer rubbers such as are available from E.I. du Pont de Nemours & Co., Inc. under the name Nordel 1070E, and rubber reclaim compositions like that sold as 5496-F by Farboil Division, Beatrice Foods, Inc. Alternatively, amorphous, rubbery poly alkyl (e.g., $C_4$ or greater) methacrylates may serve. Preferred tackifying agents include terpene phenols (such as are available from Schenectady Chem. Corporation, as SP-553 and SP-559) and Piccopale 100 SF (Hercules Chemical Corporation), a cyclic, non-aromataic thermoplastic hydrocarbon resin resulting from polymerization of unsaturates obtained from deep-cracking of petroleum. Other candidates for such employment are listed, e.g., in the copending and commonly assigned application of E. F. Lopez et al, Ser. No. 291,542 (filed Sept. 25, 1972), the disclosure of which is incorporated herein by reference. The rubbery component of the mastic may be employed in conjunction with tackifying agents, depending upon the molecular weight of other mastic components and the temperature at which the articles, in a particular application, are advantaged by aggressive tackiness. The articles of the invention are preferably tacky at room temperature. For present purposes, "tack" refers to that property of an adhesive which permits it to form a bond of measurable strength immediately after adhesive and a metal adherand are brought into contact under low pressure [Cf. I. Skeist, *Handbook of Adhesives*, Reinhold Publishing Co. (1962)]. Where the rubbery components of the mastic exhibit molecular weight substantially greater than 50,000, effective tackifying amounts of such agents are preferably employed.

Some rubbery mastic components not otherwise tackified or tacky at room temperature become so as a result of scission induced by irradiation to crosslink the matrix material. Among rubbery mastic components in which scission predominates upon exposure to ionizing radiation may be mentioned butyl rubbers; poly (vinyl alkyl ethers); amorphous, rubbery polyalkyl (e.g., $C_4$ or greater alkyl) methacrylates, and amorphous plasticized polyvinyl formals and butyrals.

As before noted, articles formed according to the invention are susceptible to the impartation of heat recoverability. Thus, the articles are heated to or about a transition temperature of the matrix material and dimensionally distorted. While holding the article in its distorted condition, it is cooled to below that transition temperature, whereafter it retains its distorted condition due to reformation of strong interchain forces such as crystallinity which at low temperatures dominate contrary stresses resulting from cross-linking. Upon reheating, the crosslink forces become dominant and the article tends to recover to its original geometry. In preferred ones of such embodiments, the articles in, e.g., sheet or ribbon form are, during impartation of heat recoverability, increased lengthwise in dimension by an amount up to about twice original length, preferably by an amount in the range of from about 15 to about 100 percent of original length. Such expansion may be effected by stretching a rubber or crepe paper substrate to which the unexpanded article is adhered or, preferably, by a continuous stretching process in which, e.g., a sheet of the matrix-mastic material is run from a frist reel to a second, faster moving reel while at or above the matrix transition temperature.

Certain of the materials employed in the examples of preferred compositions which follow are more particularly characterized below:

| Ingredient | Description | Supplier |
| --- | --- | --- |
| Alathon 7030 | high density polyethylene | E. I. duPont de Nemours & Co., Inc. |
| DFD 6040 | low density polyethylene | Union Carbide Corp. |
| DFD 6181 | 80:20 Union Carbide Corp. copolymer, melt index 2.2, density .93 | |
| Eastobond M5W | amorphous atatic polypropylene resin | Eastman Chemical Products, Inc. |
| Gilsonite Selects | mineral asphaltic composition | American Gilsonite Corporation |
| Manufactured Asphalt | asphalt, m.p. ~~170°F | Trumble Asphalt Co. of Delaware |
| P.E. 1008.5 | low density polyethylene | Gulf Oil Corp. |
| Pentalyn H | pentaerythritol resin ester | Hercules Chem. Corporation |
| Piccopale 100SF | aliphatic Hercules Chem. resin polymerizate of unsaturates from deep-cracking of petroleum | Corporation Corporation |
| Shellflex 371 N | paraffinic/naphthenic oil | Shell Oil Corp. |
| Staybellite Ester 10 | hydrogenated resin ester | Hercules Chem. Corporation |
| Thermax | a medium thermal carbon black | V. T. Vanderbilt Corporation |
| Vistanex LMMH | low M.W. (~~10,000–15,000) polyisobutylene | Exxon Corporation |
| 5496-F | asphalt-rubber reclaim blend | Beatrice Foods Inc., Farboil Div. |

EXAMPLE 1

The various components were proportioned as follows:

| Ingredient (Principal Function) | Percent by Weight |
| --- | --- |
| DPD 6181 (matrix) | 18.3 |
| Vistanex L-80 (rubbery component) | 35.3 |
| Vistanex LMMH (tackifier) | 24.0 |
| Piccopale 100 SF (tackifier) | 14.7 |
| Thermax (black) | 7.0 |
| Triallyl cyanurate (pro-rad) | 0.7 |

The Piccopale and DPD 6181 were charged to a Baker-Perkins mixer and mixed 10 minutes with steam applied. The Vistanex L-80 was added and mixing continued until the resulting mass was uniform in consistency. Thermax and pro-rad were next added, mixing continued for 20 minutes, and then Vistanex LMMH added and the resulting composition mixed until smooth. The material was then supplied to a Royale 1⅛ inch extruder equipped with a rubber screw (all zones at 300°F) and extruded to form a ribbon approximately ⅛ inch in thickness. A 15 foot length thereof was irradiated to a dose of 10 megarads, heated to in excess of the polyethylene crystalline melting temperature, expanded to increase length by 50% and cooled while held in expanded condition. When subsequently disposed about a tubular substrate and brought to above that transition temperature by torching, the article remained coherent, heat recovered to approximately its original dimension, while overlapped ends amalgamated, one with the other.

When the formulations of Examples 2–4 (see below) were similarly mixed, extruded, and rendered heat recoverable, similar results were obtained.

EXAMPLE 2

| Ingredient (function) | Percent by Weight |
| --- | --- |
| Alathon 7030 (matrix) | 24.3 |
| Nordel 1070E (mastic rubbery component) | 32.1 |
| Gilsonite Selects (extender) | 19.3 |
| Shellflex 371N (tackifier, plasticizer) | 10.4 |

EXAMPLE 2-continued

| | Percent by Weight |
| --- | --- |
| Eastobond M5W (tackifier, extender) | 6.4 |
| triallyl cyanurate (pro-rad) | 2.5 |
| Pentalyn H (tackifier) | 5.0 |

EXAMPLE 3

| Ingredient (function) | Percent by Weight |
| --- | --- |
| DFD 6040 (matrix) | 17.4 |
| Vistanex L-80 (mastic rubbery component) | 8.7 |
| Manufactured Asphalt (extender) | 69.0 |
| Staybellite Ester No. 10 (tackifier) | 2.0 |
| Shellflex 371 N (tackifier, plasticizer) | 2.1 |
| triallyl cyanurate (pro-rad) | 0.8 |

EXAMPLE 4

| Ingredient (function) | Percent by Weight |
| --- | --- |
| Polyethylene 1008.5 (matrix) | 24.8 |
| Vistanex L-80 (mastic rubbery component) | 31.0 |
| Vistanex LMMH (extender, tackifier) | 31.0 |
| SP-553 (tackifier) | 10.7 |
| triallyl cyanurate (pro-rad) | 2.5 |

EXAMPLE 5

The following formulation was mixed, extruded and irradiated as in the previous examples. When a length of the extrudate was passed about a substrate, its opposite ends overlapped, and heated with a propane torch set to provide a billowing orange flame, the article remained coherent and the coverlapped edges amalgamated.

| Ingredient (function) | Percent by Weight |
| --- | --- |
| P. E. 1008.5 (matrix) | 15 |
| 5496-F (rubbery component) | 83 |
| triallyl cyanurate | 2 |

We claim:

1. A coherent article essentially comprised of a mastic material uniformly dispersed throughout the interstices of a cross-linked polymeric matrix present in the article in minor proportion sufficient in extent to maintain it coherent at a transition temperature of the matrix.

2. An article according to claim 1 which exhibits second order cohesive blocking at room temperature.

3. An article according to claim 1 containing said matrix in an amount of from about 15% to about 25% by weight, based on the weight of said article.

4. An article according to claim 2 wherein said matrix is polyethylene and wherein said mastic material comprises a polyisobutylene rubber.

5. An article according to claim 3 wherein said matrix is polyethylene and wherein said mastic material comprises a polyisobutylene rubber.

6. A heat recoverable article according to claim 1.
7. A heat recoverable article according to claim 2.
8. A heat recoverable article according to claim 3.
9. A heat recoverable article according to claim 4.
10. A heat recoverable article according to claim 5.

* * * * *